(12) United States Patent
Li et al.

(10) Patent No.: US 12,055,688 B2
(45) Date of Patent: Aug. 6, 2024

(54) OPTICAL IMAGING LENS ASSEMBLY

(71) Applicant: ZHEJIANG SUNNY OPTICS CO., LTD., Zhejiang (CN)

(72) Inventors: Yanping Li, Zhejiang (CN); Lingbo He, Zhejiang (CN); Jianjun Li, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 607 days.

(21) Appl. No.: 17/338,721

(22) Filed: Jun. 4, 2021

(65) Prior Publication Data

US 2021/0396969 A1    Dec. 23, 2021

(30) Foreign Application Priority Data

Jun. 11, 2020   (CN) .......................... 202010529418.7

(51) Int. Cl.
*G02B 13/00*    (2006.01)
*G02B 9/60*    (2006.01)

(52) U.S. Cl.
CPC .......... *G02B 13/0045* (2013.01); *G02B 9/60* (2013.01)

(58) Field of Classification Search
CPC .............................. G02B 13/0045; G02B 9/60
USPC ........................................................... 359/763
See application file for complete search history.

(56) References Cited

U.S. PATENT DOCUMENTS

| | | | | |
|---|---|---|---|---|
| 9,188,766 B1* | 11/2015 | Tsai | ......................... | G02B 9/60 |
| 9,625,677 B2* | 4/2017 | Tang | ......................... | G02B 9/60 |
| 9,651,758 B2* | 5/2017 | Tang | ................... | G02B 13/0045 |
| 10,007,094 B1* | 6/2018 | Dai | ..................... | G02B 13/0045 |
| 11,029,494 B2* | 6/2021 | Song | ................... | G02B 13/0045 |
| 11,092,785 B2* | 8/2021 | Ke | ...................... | G02B 13/0045 |
| 2016/0161720 A1* | 6/2016 | Son | ..................... | G02B 13/0045 |
| | | | | 359/714 |

* cited by examiner

*Primary Examiner* — Thomas K Pham
*Assistant Examiner* — William Brent Hernandez
(74) *Attorney, Agent, or Firm* — Samson G. Yu

(57) ABSTRACT

The disclosure discloses an optical imaging lens assembly, which sequentially includes, from an object side to an image side along an optical axis, a first lens, a second lens, a third lens, a fourth lens and a fifth lens with refractive power respectively, wherein TTL is a distance from an object-side surface of the first lens to an imaging surface of the optical imaging lens assembly on the optical axis, and ImgH is a half of a diagonal length of an effective pixel region on the imaging surface of the optical imaging lens assembly, TTL and ImgH meet TTL/ImgH<1.5; and a sum fp of effective focal lengths of the lenses with positive refractive power in the first lens to the fifth lens and a sum fm of effective focal lengths of the lenses with negative refractive power in the first lens to the fifth lens meet −19.0<fm/fp<−10.0.

17 Claims, 10 Drawing Sheets

OPTICAL IMAGING LENS ASSEMBLY

CROSS-REFERENCE TO RELATED APPLICATION(S)

The disclosure claims priority to Chinese Patent Application No. 202010529418.7, filed on Jun. 11, 2020 and entitled "Optical imaging lens assembly", the contents of which are hereby incorporated by reference in its entirety.

TECHNICAL FIELD

The disclosure relates to the field of optical elements, and particularly to an optical imaging lens assembly.

BACKGROUND

In 2000, Sharp launched the world's first camera phone with a 110,000-pixel rear camera. A new auto-focus function for photographing with mobile phones has been continued to the present day since realized by Sony Ericsson in 2005. Over the next more than ten years, cameras of mobile phones have been rapidly developed with the development of smart phones, from 8 mega-pixels in 2010 to 100 mega-pixels in 2020 and from single-lens cameras a few years ago to present combined multi-lens cameras and then to present front holed cameras pursued by various major manufacturers. New developments may be made regularly to photographing with mobile phones, and more surprising experiences may be brought to users every time when an improvement is made.

Wide-angle lens, as one of present multi-lens imaging cameras, has the following unique characteristics: a visual angle of the lens is large, a visual field is wide, and a scenery range observed from a certain visual point is much larger than a scenery range seen by human eyes from the same visual point; a depth of field is great, and a quite large clear range may be presented; and a perspective effect of a picture may be emphasized, and the wide-angle lens is good at exaggerating a foreground and presenting a perspective of a scenery, favorable for enhancing the infection of the picture and extensively applied to large-field scenery photos. With the constant development of portable electronic products such as smart phones, requirements of users on the performance and appearances of optical imaging lens assembly of portable electronic products such as smart phones have also increased, and small-head wide-angle lenses have become goals that various major manufacturers of portable electronic products such as smart phones pursue.

SUMMARY

The disclosure provides an optical imaging lens assembly, which sequentially includes, from an object side to an image side along an optical axis, a first lens, a second lens, a third lens, a fourth lens and a fifth lens with refractive power respectively, wherein TTL is a distance from an object-side surface of the first lens to an imaging surface of the optical imaging lens assembly on the optical axis, and ImgH is a half of a diagonal length of an effective pixel region on the imaging surface of the optical imaging lens assembly, TTL and ImgH may meet TTL/ImgH<1.5; and a sum fp of effective focal lengths of the lenses with positive refractive power in the first lens to the fifth lens and a sum fm of effective focal lengths of the lenses with negative refractive power in the first lens to the fifth lens may meet $-19.0<\text{fm}/\text{fp}<-10.0$.

In an implementation mode, the object-side surface of the first lens to an image-side surface of the fifth lens include at least one aspheric mirror surface.

In an implementation mode, Semi-FOV is a half of a maximum field of view of the optical imaging lens assembly and CRAmax is a maximum incident angle of incidence of a chief ray in an electronic photosensitive component, Semi-FOV and CRAmax may meet Semi-FOV/CRAmax>1.0.

In an implementation mode, DT11 is a maximum effective radius of the object-side surface of the first lens, and DT51 is a maximum effective radius of an object-side surface of the fifth lens, DT51 and DT11 meet 3.0<DT51/DT11<4.0.

In an implementation mode, ARE12 is a contour curve length from an intersection point of an image-side surface of the first lens and the optical axis to a point at ½ of an Entrance Pupil Diameter (EPD) of the optical imaging lens assembly on the image-side surface of the first lens, and SAG12 is a distance from the intersection point of the image-side surface of the first lens and the optical axis to an effective radius vertex of the image-side surface of the first lens on the optical axis, ARE12 and SAG12 may meet 9.0<ARE12/|SAG12|<17.0.

In an implementation mode, ARE31 is a contour curve length from an intersection point of an object-side surface of the third lens and the optical axis to a point at ½ of the EPD of the optical imaging lens assembly on the object-side surface of the third lens, and SAG31 is a distance from the intersection point of the object-side surface of the third lens and the optical axis to an effective radius vertex of the object-side surface of the third lens on the optical axis, ARE31 and SAG31 may meet 6.5<ARE31/|SAG31|<14.5.

In an implementation mode, an Abbe number V4 of the fourth lens and a curvature radius R7 of an object-side surface of the fourth lens may meet $-8.5\ \text{mm}^{-1}<\text{V4}/\text{R7}<-6.0\ \text{mm}^{-1}$. In an implementation mode, a spacing distance T45 of the fourth lens and the fifth lens on the optical axis and a center thickness CT2 of the second lens on the optical axis may meet 1.5<T45/CT2<2.5.

In an implementation mode, a total effective focal length f of the optical imaging lens assembly and the EPD of the optical imaging lens assembly may meet 2.0<f/EPD<2.5.

In an implementation mode, the optical imaging lens assembly further includes an aperture diaphragm, and a distance SL from the aperture diaphragm to the imaging surface of the optical imaging lens assembly on the optical axis and a sum ΣCT of center thicknesses of the first lens to the fifth lens on the optical axis may meet 1.5<SL/ΣCT<2.5.

In an implementation mode, the first lens has positive refractive power, and the object-side surface thereof is a convex surface.

In an implementation mode, an Abbe number V2 of the second lens and a curvature radius R4 of an image-side surface of the second lens may meet $3.0\ \text{mm}^{-1}<\text{V2}/\text{R4}<6.0\ \text{mm}^{-1}$.

In an implementation mode, a curvature radius R1 of the object-side surface of the first lens and the curvature radius R4 of the image-side surface of the second lens may meet 2.0<R4/R1<3.5.

In an implementation mode, a curvature radius R5 of the object-side surface of the third lens and a curvature radius R10 of the image-side surface of the fifth lens may meet 5.0<R5/R10<7.0.

Another aspect of the disclosure provides an optical imaging lens assembly, which sequentially includes, from an object side to an image side along an optical axis, a first lens, a second lens, a third lens, a fourth lens and a fifth lens with refractive power respectively, wherein TTL is a distance from an object-side surface of the first lens to an imaging surface of the optical imaging lens assembly on the optical axis, and ImgH is a half of a diagonal length of an effective pixel region on the imaging surface of the optical imaging lens assembly, TTL and ImgH may meet TTL/ImgH<1.5; and ARE12 is a contour curve length from an intersection point of an image-side surface of the first lens and the optical axis to a point at ½ of an Entrance Pupil Diameter (EPD) of the optical imaging lens assembly on the image-side surface of the first lens, and SAG12 is a distance from the intersection point of the image-side surface of the first lens and the optical axis to an effective radius vertex of the image-side surface of the first lens on the optical axis, ARE12 and SAG12 may meet 9.0<ARE12/|SAG12|<17.0.

According to the disclosure, multiple (for example, five) lenses are adopted, and the refractive power and surface types of each lens, the center thickness of each lens, on-axis distances between the lenses and the like are reasonably configured to achieve at least one beneficial effect of small head, wide angle, high imaging quality and the like of the optical imaging lens assembly.

BRIEF DESCRIPTION OF THE DRAWINGS

Detailed descriptions made to unrestrictive implementation modes with reference to the following drawings are read to make the other characteristics, purposes and advantages of the disclosure more apparent.

DETAILED DESCRIPTION OF THE EMBODIMENTS

Figure 1:
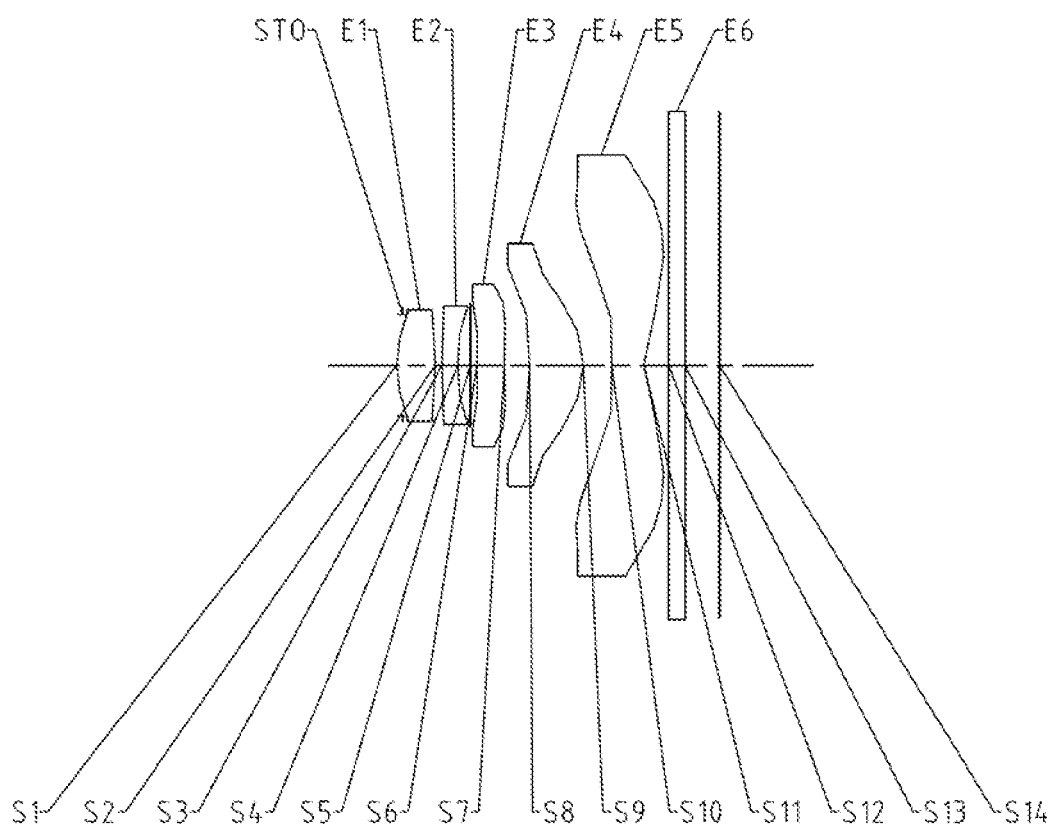
FIG. 1 shows a structure diagram of an optical imaging lens assembly according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

An optical imaging lens assembly according to an exemplary implementation mode of the disclosure may include five lenses with refractive power, i.e., a first lens, a second lens, a third lens, a fourth lens and a fifth lens with refractive power respectively. The five lenses are sequentially arranged from an object side to an image side along an optical axis. In the first lens to the fifth lens, there may be a spacing distance between any two adjacent lenses.

The first lens has refractive power, and the second lens has refractive power, so that enlargement of a field of view of the optical imaging lens assembly is facilitated, and meanwhile, compression of an incident angle of a ray at a position of an aperture diaphragm, reduction of a pupil aberration and improvement of the imaging quality are also facilitated. The third lens has refractive power, so that reduction of a spherical aberration and astigmatism of the system is facilitated. The fourth lens has refractive power, so that achievement of high imaging quality and loose machining characteristic of the optical imaging lens assembly that is compact in structure is facilitated. The fifth lens has refractive power, so that reasonable control over spherical aberration contributions of a front-end optical component and a rear-end optical component in a reasonable range for achievement of high imaging quality in an on-axis field of view is facilitated.

In the exemplary implementation mode, the optical imaging lens assembly according to the disclosure may meet TTL/ImgH<1.5, wherein TTL is a distance from an object-side surface of the first lens to an imaging surface of the optical imaging lens assembly on the optical axis, and ImgH is a half of a diagonal length of an effective pixel region on the imaging surface of the optical imaging lens assembly. More specifically, TTL and ImgH may further meet TTL/ImgH<1.4. Meeting TTL/ImgH<1.5 is favorable for ensuring an ultra-thin characteristic of the optical imaging lens assembly.

In the exemplary implementation mode, the optical imaging lens assembly according to the disclosure may meet Semi-FOV/CRAmax>1.0, wherein Semi-FOV is a half of a maximum field of view of the optical imaging lens assembly, and CRAmax is a maximum incident angle of incidence of a chief ray in an electronic photosensitive component. More specifically, Semi-FOV and CRAmax may further meet Semi-FOV/CRAmax>1.1. Semi-FOV/CRAmax>1.0 is met, so that a wide-angle characteristic of the optical imaging lens assembly may be ensured effectively, and furthermore, effects of extending a shooting range, increasing a shooting depth of field and the like are achieved.

In the exemplary implementation mode, the optical imaging lens assembly according to the disclosure may meet −19.0<fm/fp<−10.0, wherein fp is a sum of effective focal lengths of the lenses with positive refractive power in the first lens to the fifth lens, and fm is a sum of effective focal lengths of the lenses with negative refractive power in the first lens to the fifth lens. More specifically, fm and fp may further meet −18.3<fm/fp<−10.5. −19.0<fm/fp<−10.0 is met, so that the refractive power of the optical imaging lens assembly may be configured better, and furthermore, an aberration generated by the system may be balanced well to achieve high imaging quality.

In the exemplary implementation mode, the optical imaging lens assembly according to the disclosure may meet 3.0<DT51/DT11<4.0, wherein DT11 is a maximum effective radius of the object-side surface of the first lens, and DT51 is a maximum effective radius of an object-side surface of the fifth lens. More specifically, DT51 and DT11 may further meet 3.2<DT51/DT11<4.0. 3.0<DT51/DT11<4.0 is met, so that lens calibers of the first lens and the fifth lens may be restricted effectively, an assembling segment gap of the optical imaging lens assembly may be kept in a reasonable machining range, and forming machining and assembling are facilitated.

In the exemplary implementation mode, the optical imaging lens assembly according to the disclosure may meet 9.0<ARE12/|SAG121|<17.0, wherein ARE12 is a contour curve length from an intersection point of an image-side surface of the first lens and the optical axis to a point at ½ of an EPD of the optical imaging lens assembly on the image-side surface of the first lens, and SAG12 is a distance from the intersection point of the image-side surface of the first lens and the optical axis to an effective radius vertex of the image-side surface of the first lens on the optical axis. More specifically, ARE12 and SAG12 may further meet 9.3<ARE12/|SAG12|<16.8. Meeting 9.0<ARE12/|SAG12|<17.0 is favorable for enlarging the field of view and is also favorable for compressing the incident angle of the ray at the position of the aperture diaphragm, reducing the pupil aberration and improving the imaging quality.

In the exemplary implementation mode, the optical imaging lens assembly according to the disclosure may meet 6.5<ARE31/|SAG31|<14.5, wherein ARE31 is a contour curve length from an intersection point of an object-side surface of the third lens and the optical axis to a point at ½ of the EPD of the optical imaging lens assembly on the object-side surface of the third lens, and SAG31 is a distance from the intersection point of the object-side surface of the third lens and the optical axis to an effective radius vertex of the object-side surface of the third lens on the optical axis. In other words, ARE31 is a contour curve length on the object-side surface of the third lens, specifically a contour curve length of the third lens extending along a radial direction of the third lens from the intersection point of the object-side surface of the third lens and the optical axis to the point at ½ of the EPD of the optical imaging lens assembly on the object-side surface of the third lens. More specifically, ARE31 and SAG31 may further meet 6.7<ARE31/|SAG31|<14.2. 6.5<ARE31/|SAG31|<14.5 is met, so that coma generated by the front-end component may be balanced well, and high imaging quality may be achieved.

In the exemplary implementation mode, the optical imaging lens assembly according to the disclosure may meet −8.5 mm$^{-1}$<V4/R7<−6.0 mm$^{-1}$, wherein V4 is an Abbe number of the fourth lens, and R7 is a curvature radius of an object-side surface of the fourth lens. More specifically, V4 and R7 may further meet −8.5 mm$^{-1}$<V4/R7<−6.1 mm$^{-1}$. −8.5 mm$^{-1}$<V4/R7<−6.0 mm$^{-1}$ is met, so that a shape of the fourth lens may be limited effectively to make the lens uniform in thickness and convenient to form, machine and assemble, and meanwhile, reduction of the spherical aberration and astigmatism of the system is facilitated.

In the exemplary implementation mode, the optical imaging lens assembly according to the disclosure may meet a conditional expression 1.5<T45/CT2<2.5, wherein T45 is a spacing distance of the fourth lens and the fifth lens on the optical axis, and CT2 is a center thickness of the second lens on the optical axis. More specifically, T45 and CT2 may further meet 1.7<T45/CT2<2.2. 1.5<T45/CT2<2.5 is met, so that shapes and thicknesses of the second lens, the fourth lens and the fifth lens may be restricted effectively to make the lenses uniform in thickness and convenient to form and machine.

In the exemplary implementation mode, the optical imaging lens assembly according to the disclosure may meet 2.0<f/EPD<2.5, wherein f is a total effective focal length of the optical imaging lens assembly, and EPD is the Entrance Pupil Diameter of the optical imaging lens assembly. More specifically, f and EPD may further meet 2.2<f/EPD<2.5. 2.0<f/EPD<2.5 is met, so that a luminous flux and depth of field of the optical imaging lens assembly may be controlled effectively, different shooting effects may be achieved by different f-numbers, and meanwhile, a maximum effective radius of the first lens may be controlled effectively to implement miniaturization of the lens.

In the exemplary implementation mode, the optical imaging lens assembly according to the disclosure may meet $1.5 < SL/\Sigma CT < 2.5$, wherein SL is a distance from the aperture diaphragm to the imaging surface of the optical imaging lens assembly on the optical axis, and $\Sigma CT$ is a sum of center thicknesses of the first lens to the fifth lens on the optical axis. More specifically, SL and $\Sigma CT$ may further meet $1.8 < SL/\Sigma CT < 2.1$. $1.5 < SL/\Sigma CT < 2.5$ is met, so that the ultra-thin characteristic of the optical imaging lens assembly may be ensured, and a present trend of development of optical imaging lens assemblyes is met better.

In the exemplary implementation mode, the first lens may have positive refractive power, and the object-side surface thereof may be a convex surface. Such refractive power and surface type design of the first lens are favorable for achieving high imaging quality and loose machining characteristic of the optical imaging lens assembly that is compact in structure.

In the exemplary implementation mode, the optical imaging lens assembly according to the disclosure may meet $3.0 \text{ mm}^{-1} < V2/R4 < 6.0 \text{ mm}^{-1}$, wherein V2 is an Abbe number of the second lens, and R4 is a curvature radius of an image-side surface of the second lens. More specifically, V2 and R4 may further meet $3.4 \text{ mm}^{-1} < V2/R4 < 5.8 \text{ mm}^{-1}$. $3.0 \text{ mm}^{-1} < V2/R4 < 6.0 \text{ mm}^{-1}$ is met, so that a shape of the second lens may be limited effectively to make the lens uniform in thickness and convenient to form, machine and assemble, and meanwhile, reduction of the spherical aberration and astigmatism of the system is facilitated.

In the exemplary implementation mode, the optical imaging lens assembly according to the disclosure may meet a conditional expression $2.0 < R4/R1 < 3.5$, wherein R1 is a curvature radius of the object-side surface of the first lens, and R4 is the curvature radius of the image-side surface of the second lens. More specifically, R4 and R1 may further meet $2.0 < R4/R1 < 3.3$.

In the exemplary implementation mode, the optical imaging lens assembly according to the disclosure may meet $5.0 < R5/R10 < 7.0$, wherein R5 is a curvature radius of the object-side surface of the third lens, and R10 is a curvature radius of an image-side surface of the fifth lens. More specifically, R5 and R10 may further meet $5.0 < R5/R10 < 6.9$.

In the exemplary implementation mode, the optical imaging lens assembly according to the disclosure may further include the aperture diaphragm arranged between the object side and the first lens. Optionally, the optical imaging lens assembly may further include a field of view diaphragm arranged between the second lens and the third lens. Optionally, the optical imaging lens assembly may further include an optical filter configured to correct a chromatic aberration and/or protective glass configured to protect a photosensitive element on the imaging surface.

The optical imaging lens assembly according to the implementation mode of the disclosure may adopt multiple lenses, for example, the abovementioned five. The refractive power and surface types of each lens, the center thickness of each lens, on-axis distances between the lenses and the like are reasonably configured to effectively reduce the size of the optical imaging lens assembly, improve the machinability of the optical imaging lens assembly and ensure that the optical imaging lens assembly is more favorable for production and machining and applicable to a portable electronic product. The optical imaging lens assembly as configured above has the characteristics of small head, wide angle, high imaging quality and the like, and may meet using requirements of various portable electronic products in a shooting scenario.

In the implementation mode of the disclosure, at least one of mirror surfaces of each lens is an aspheric mirror surface, namely at least one mirror surface in the object-side surface of the first lens to the image-side surface of the fifth lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With adoption of the aspheric lens, astigmatic aberrations during imaging may be eliminated as much as possible to further improve the imaging quality. Optionally, at least one of the object-side surface and image-side surface of each lens in the first lens, the second lens, the third lens, the fourth lens and the fifth lens is an aspheric mirror surface. Optionally, both the object-side surface and image-side surface of each lens in the first lens, the second lens, the third lens, the fourth lens and the fifth lens are aspheric mirror surfaces.

However, those skilled in the art should know that the number of the lenses forming the optical imaging lens assembly may be changed without departing from the technical solutions claimed in the disclosure to achieve each result and advantage described in the specification. For example, although descriptions are made in the implementation with five lenses as an example, the optical imaging lens assembly is not limited to five lenses. If necessary, the optical imaging lens assembly may further include another number of lenses.

Specific embodiments applied to the optical imaging lens assembly of the abovementioned implementation mode will further be described below with reference to the drawings.

Embodiment 1

An optical imaging lens assembly according to embodiment 1 of the disclosure will be described below with reference to FIG. 1 to FIG. 2B. FIG. 1 is a structure diagram of an optical imaging lens assembly according to embodiment 1 of the disclosure.

As shown in FIG. 1, the optical imaging lens assembly sequentially includes, from an object side to an image side, an aperture diaphragm STO, a first lens E1, a second lens E2, a third lens E3, a fourth lens E4, a fifth lens E5, an optical filter E6 and an imaging surface S14.

The first lens E1 has positive refractive power, an object-side surface S1 thereof is a convex surface, while an image-side surface S2 is a concave surface. The second lens E2 has negative refractive power, an object-side surface S3 thereof is a convex surface, while an image-side surface S4 is a concave surface. The third lens E3 has negative refractive power, an object-side surface S6 thereof is a convex surface, while an image-side surface S7 is a concave surface. The fourth lens E4 has positive refractive power, an object-side surface S8 thereof is a concave surface, while an image-side surface S9 is a convex surface. The fifth lens E5 has negative refractive power, an object-side surface S10 thereof is a convex surface, while an image-side surface S11 is a concave surface. The optical filter E6 has an object-side surface S12 and an image-side surface S13. Light from an object sequentially penetrates through each of the surfaces S1 to S13 and is finally imaged on the imaging surface S14.

Table 1 is a basic parameter table of the optical imaging lens assembly of embodiment 1, and units of the curvature radius, the thickness/distance and the focal length are all millimeter (mm).

TABLE 1

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | 350.0000 | | | | |
| STO | Spherical | Infinite | −0.0800 | | | | |
| S1 | Aspheric | 1.5688 | 0.5067 | 1.55 | 56.1 | 2.95 | −0.4074 |
| S2 | Aspheric | 55.5185 | 0.0878 | | | | −99.0000 |
| S3 | Aspheric | 17.3966 | 0.2100 | 1.68 | 19.2 | −6.22 | 40.6231 |
| S4 | Aspheric | 3.3766 | 0.1648 | | | | 6.9145 |
| S5 | Spherical | Infinite | 0.0844 | | | | |
| S6 | Aspheric | 5.8824 | 0.3599 | 1.55 | 56.1 | −87.46 | 6.7808 |
| S7 | Aspheric | 5.1240 | 0.3342 | | | | −68.4082 |
| S8 | Aspheric | −6.6407 | 0.7059 | 1.55 | 56.1 | 2.33 | 5.0715 |
| S9 | Aspheric | −1.1058 | 0.3740 | | | | −1.0277 |
| S10 | Aspheric | 16.9639 | 0.4221 | 1.54 | 55.7 | −2.22 | 44.7338 |
| S11 | Aspheric | 1.1057 | 0.3280 | | | | −0.9657 |
| S12 | Spherical | Infinite | 0.2100 | 1.52 | 64.2 | | |
| S13 | Spherical | Infinite | 0.4544 | | | | |
| S14 | Spherical | Infinite | | | | | |

In the example, a total effective focal length f of the optical imaging lens assembly is 3.24 mm, a Total Track Length (TTL) of the optical imaging lens assembly (i.e., a distance from the object-side surface S1 of the first lens E1 to the imaging surface S14 of the optical imaging lens assembly on an optical axis) is 4.24 mm, ImgH is a half of a diagonal length of an effective pixel region on the imaging surface S14 of the optical imaging lens assembly, ImgH is 3.28 mm, Semi-FOV is a half of a maximum field of view of the optical imaging lens assembly, Semi-FOV is 45.0°, ARE12 is a contour curve length from an intersection point of an image-side surface of the first lens and the optical axis to a point at ½ of an Entrance Pupil Diameter (EPD) of the optical imaging lens assembly on the image-side surface of the first lens, ARE12 is 0.66 mm, ARE31 is a contour curve length from an intersection point of an object-side surface of the third lens and the optical axis to a point at ½ of the EPD of the optical imaging lens assembly on the object-side surface of the third lens, ARE31 is 0.66 mm, and DT51 is a maximum effective radius of an object-side surface of the fifth lens, DT51 is 2.39 mm.

In embodiment 1, both the object-side surface and image-side surface of any lens in the first lens E1 to the fifth lens E5 are aspheric surfaces, and a surface type x of each aspheric lens may be defined through, but not limited to, the following aspheric surface formula:

$$x = \frac{ch^2}{1+\sqrt{1-(k+1)c^2h^2}} + \sum A_i h^i, \quad (1)$$

wherein x is a distance vector height from a vertex of the aspheric surface when the aspheric surface is at a height of h along the optical axis direction; c is a paraxial curvature of the aspheric surface, c=1/R (namely, the paraxial curvature c is a reciprocal of the curvature radius R in Table 1); k is a cone coefficient; and Ai is a correction coefficient of the i-th order of the aspheric surface. The Tables 2-1 and 2-2 show high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applied to the aspheric mirror surfaces S1-S4 and S6-S11 in embodiment 1.

TABLE 2-1

| Surface number | A4 | A6 | A8 | A10 | A12 | A14 | A16 |
|---|---|---|---|---|---|---|---|
| S1 | −3.4581E−02 | 4.8154E−01 | −7.5267E+00 | 6.3149E+01 | −3.2919E+02 | 1.0666E+03 | −2.0954E+03 |
| S2 | −1.6089E−01 | 4.3791E−01 | −3.8238E+00 | 2.2491E+01 | −9.2773E+01 | 2.3819E+02 | 3.5513E+02 |
| S3 | −8.2356E−02 | 6.8276E−01 | −3.3433E+00 | 1.7685E+01 | −7.5919E+01 | 2.0824E+02 | −3.3249E+02 |
| S4 | −5.4867E−02 | 6.5503E−01 | 2.1859E+00 | 8.3196E+00 | −2.8033E+01 | 6.3297E+01 | −8.4384E+01 |
| S6 | −4.1730E−01 | 3.8489E+00 | −6.3739E+01 | 7.1566E+02 | −5.4948E+03 | 2.9735E+04 | −1.1576E+05 |
| S7 | −1.5265E−01 | −3.0218E−01 | 5.5958E+00 | −5.2873E+01 | 3.1049E+02 | −1.2306E+03 | 3.4290E+03 |
| S8 | −8.9519E−03 | −5.2696E−01 | 3.6895E+00 | −1.9710E+01 | 7.3873E+01 | −1.9843E+02 | 3.8675E+02 |
| S9 | 2.0442E−01 | −1.0043E+00 | 4.5646E+00 | −1.5596E+01 | 3.7025E+01 | −6.1349E+01 | 7.1908E+01 |
| S10 | −1.1950E−01 | −3.5791E−01 | 9.4494E−01 | −1.3706E+00 | 1.3894E+00 | −9.9817E−01 | 5.0936E−01 |
| S11 | −3.7239E−01 | 1.3453E−01 | 1.5586E−01 | −3.4775E−01 | 3.4101E−01 | −2.1291E−01 | 9.1862E−02 |

TABLE 2-2

| Surface number | A18 | A20 | A22 | A24 | A26 | A28 | A30 |
|---|---|---|---|---|---|---|---|
| S1 | 2.2843E+03 | −1.0608E+03 | 0.0000E+00 | 0.0000E+00 | 0.0000E+00 | 0.0000E+00 | 0.0000E+00 |
| S2 | 2.7613E+02 | −8.4260E+01 | 0.0000E+00 | 0.0000E+00 | 0.0000E+00 | 0.0000E+00 | 0.0000E+00 |
| S3 | 2.8326E+02 | −1.0019E+02 | 0.0000E+00 | 0.0000E+00 | 0.0000E+00 | 0.0000E+00 | 0.0000E+00 |
| S4 | 6.1036E+01 | −1.8895E+01 | 0.0000E+00 | 0.0000E+00 | 0.0000E+00 | 0.0000E+00 | 0.0000E+00 |

TABLE 2-2-continued

| Surface number | A18 | A20 | A22 | A24 | A26 | A28 | A30 |
|---|---|---|---|---|---|---|---|
| S6 | 3.2752E+05 | −6.7368E+05 | 9.9638E+05 | −1.0319E+06 | 7.0997E+05 | −2.9146E+05 | 5.4013E+04 |
| S7 | 6.8516E+03 | 9.8648E+03 | −1.0147E+04 | 7.2713E+03 | −3.4479E+03 | 9.7229E+02 | −1.2347E+02 |
| S8 | −5.4727E+02 | 5.5925E+02 | −4.0721E+02 | 2.0553E+02 | −6.8199E+01 | 1.3356E+01 | −1.1681E+00 |
| S9 | −6.0069E+01 | 3.5816E+01 | −1.5130E+01 | 4.4290E+00 | −8.5579E−01 | 9.8338E−02 | −5.0964E−03 |
| S10 | −1.8541E−01 | 4.8147E−02 | −8.8353E−03 | 1.1181E−03 | −9.2769E−05 | 4.5402E−06 | −9.9329E−08 |
| S11 | −2.8196E−02 | 6.2011E−03 | −9.6907E−04 | 1.0491E−04 | −7.4700E−06 | 3.1429E−07 | −5.9147E−09 |

Figure 2A:
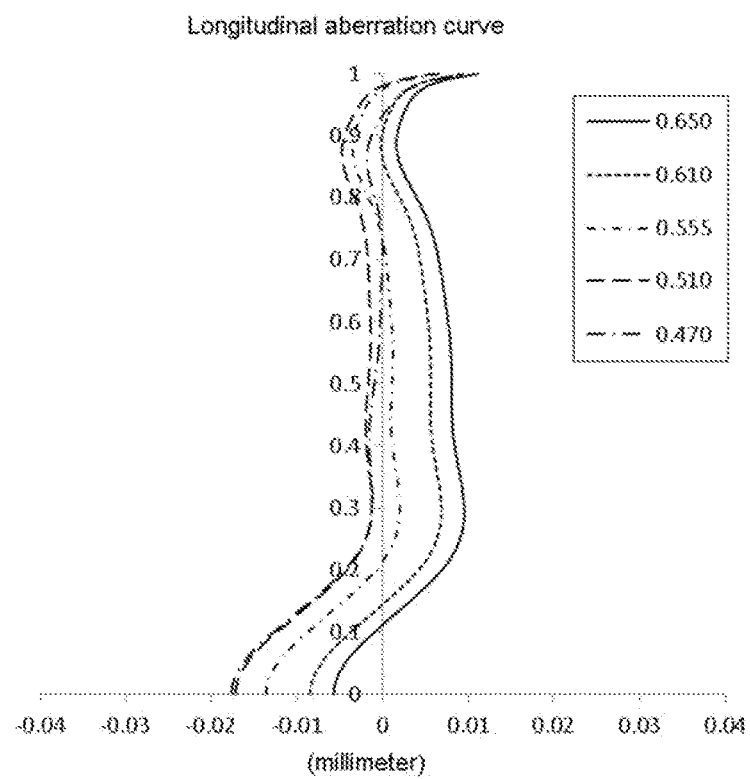
FIG. 2A and FIG. 2B show a longitudinal aberration curve and a distortion curve of an optical imaging lens assembly according to embodiment 1 respectively.
Figure 2B:
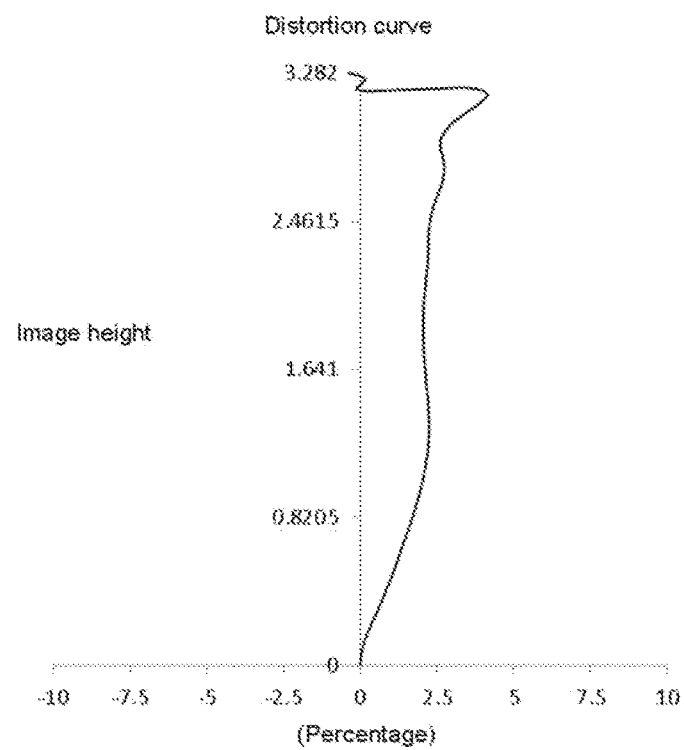

FIG. 2A shows a longitudinal aberration curve of the optical imaging lens assembly according to embodiment 1 to represent deviation of a convergence focal point after light with different wavelengths passes through the lens. FIG. 2B shows a distortion curve of the optical imaging lens assembly according to embodiment 1 to represent distortion values corresponding to different image heights. According to FIG. 2A and FIG. 2B, it can be seen that the optical imaging lens assembly provided in embodiment 1 may achieve high imaging quality.

Embodiment 2

Figure 3:
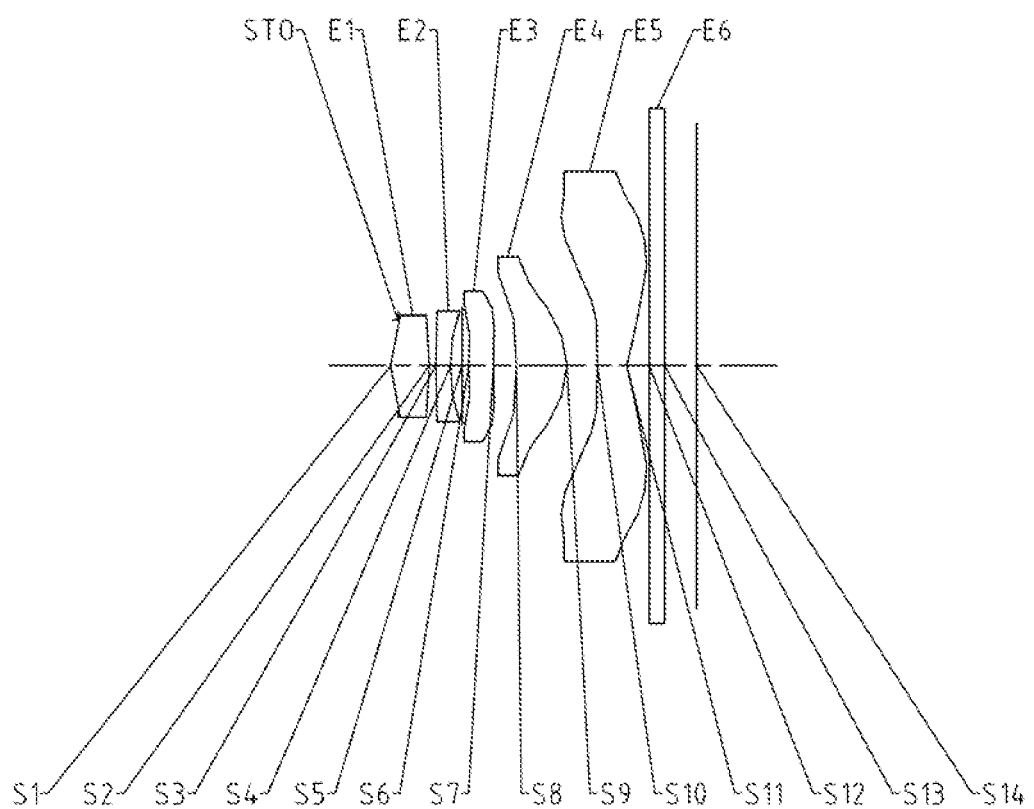
FIG. 3 shows a structure diagram of an optical imaging lens assembly according to embodiment 2 of the disclosure.

An optical imaging lens assembly according to embodiment 2 of the disclosure will be described below with reference to FIG. 3 to FIG. 4B. In the embodiment and the following embodiments, part of descriptions similar to those about embodiment 1 are omitted for simplicity. FIG. 3 is a structure diagram of an optical imaging lens assembly according to embodiment 2 of the disclosure.

As shown in FIG. 3, the optical imaging lens assembly sequentially includes, from an object side to an image side, an aperture diaphragm STO, a first lens E1, a second lens E2, a third lens E3, a fourth lens E4, a fifth lens E5, an optical filter E6 and an imaging surface S14.

The first lens E1 has positive refractive power, an object-side surface S1 thereof is a convex surface, while an image-side surface S2 is a convex surface. The second lens E2 has negative refractive power, an object-side surface S3 thereof is a convex surface, while an image-side surface S4 is a concave surface. The third lens E3 has negative refractive power, an object-side surface S6 thereof is a convex surface, while an image-side surface S7 is a concave surface. The fourth lens E4 has positive refractive power, an object-side surface S8 thereof is a concave surface, while an image-side surface S9 is a convex surface. The fifth lens E5 has negative refractive power, an object-side surface S10 thereof is a convex surface, while an image-side surface S11 is a concave surface. The optical filter E6 has an object-side surface S12 and an image-side surface S13. Light from an object sequentially penetrates through each of the surfaces S1 to S13 and is finally imaged on the imaging surface S14.

In the example, a total effective focal length f of the optical imaging lens assembly is 3.08 mm, a TTL of the optical imaging lens assembly is 4.12 mm, ImgH is a half of a diagonal length of an effective pixel region on the imaging surface S14 of the optical imaging lens assembly, ImgH is 3.28 mm, Semi-FOV is a half of a maximum field of view of the optical imaging lens assembly, Semi-FOV is 45.7°, ARE12 is a contour curve length from an intersection point of an image-side surface of the first lens and the optical axis to a point at ½ of an Entrance Pupil Diameter (EPD) of the optical imaging lens assembly on the image-side surface of the first lens, ARE12 is 0.62 mm, ARE31 is a contour curve length from an intersection point of an object-side surface of the third lens and the optical axis to a point at ½ of the EPD of the optical imaging lens assembly on the object-side surface of the third lens, ARE31 is 0.62 mm, and a maximum effective radius DT51 of the object-side surface of the fifth lens is 2.32 mm.

Table 3 is a basic parameter table of the optical imaging lens assembly of embodiment 2, and units of the curvature radius, the thickness/distance and the focal length are all mm. Tables 4-1 and 4-2 show high-order coefficients applied to each aspheric mirror surface in embodiment 2. A surface type of each aspheric surface may be defined by formula (1) given in embodiment 1.

TABLE 3

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | 350.0000 | | | | |
| STO | Spherical | Infinite | −0.1000 | | | | |
| S1 | Aspheric | 1.6225 | 0.5207 | 1.55 | 56.1 | 2.93 | −0.4936 |
| S2 | Aspheric | −100.0000 | 0.0890 | | | | 80.0000 |
| S3 | Aspheric | 22.2339 | 0.2000 | 1.68 | 19.2 | −5.99 | −84.3377 |
| S4 | Aspheric | 3.4173 | 0.1564 | | | | 7.0656 |
| S5 | Spherical | Infinite | 0.0904 | | | | |
| S6 | Aspheric | 5.5451 | 0.3269 | 1.55 | 56.1 | −85.00 | 1.4481 |
| S7 | Aspheric | 4.8501 | 0.3108 | | | | −68.2635 |
| S8 | Aspheric | −8.0483 | 0.6833 | 1.55 | 56.1 | 2.22 | 6.4066 |
| S9 | Aspheric | −1.0857 | 0.4086 | | | | −1.0183 |
| S10 | Aspheric | 16.4110 | 0.3950 | 1.54 | 55.7 | −2.19 | 44.7338 |
| S11 | Aspheric | 1.0886 | 0.3018 | | | | −0.9602 |
| S12 | Spherical | Infinite | 0.2100 | 1.52 | 64.2 | | |
| S13 | Spherical | Infinite | 0.4282 | | | | |
| S14 | Spherical | Infinite | | | | | |

TABLE 4-1

| Surface number | A4 | A6 | A8 | A10 | A12 | A14 | A16 |
|---|---|---|---|---|---|---|---|
| S1 | −4.6903E−02 | 7.5519E−01 | −1.2497E+01 | 1.1563E+02 | −6.6944E+02 | 2.4258E+03 | −5.3492E+03 |
| S2 | −1.6833E−01 | 4.5941E−01 | −5.1632E+00 | 3.8379E+01 | −1.9594E+02 | 6.3212E+02 | −1.2215E+03 |
| S3 | −7.0217E−02 | 7.1761E−01 | −5.2336E+00 | 3.5137E+01 | −1.6636E+02 | 4.9427E+02 | −8.6895E+02 |
| S4 | −3.4672E−02 | 6.5130E−01 | −2.9912E+00 | 1.4283E+01 | −5.3388E+01 | 1.3170E+02 | −1.9721E+02 |
| S6 | −3.8263E−01 | 2.2528E+00 | −2.8936E+01 | 2.6418E+02 | 1.7028E+03 | 7.8768E+03 | −2.6345E+04 |
| S7 | −1.4123E−01 | −7.1613E−01 | 1.2495E+01 | −1.1747E+02 | 6.8912E+02 | 2.7382E+03 | 7.6755E+03 |
| S8 | 4.3759E−03 | −7.2877E−01 | 6.4168E+00 | −3.7415E+01 | 1.4456E+02 | −3.8893E+02 | 7.4652E+02 |
| S9 | 2.0337E−01 | −9.0992E−01 | 3.6771E+00 | −1.0585E+01 | 1.9713E+01 | −2.2469E+01 | 1.2302E+01 |
| S10 | −1.0276E−01 | −4.5887E−01 | 1.2131E+00 | −1.8313E+00 | 1.8843E+00 | −1.3437E+00 | 6.7337E−01 |
| S11 | −3.3985E−01 | 2.5673E−03 | 4.2817E−01 | −7.0751E−01 | 6.6281E−01 | −4.1434E−01 | 1.8172E−01 |

TABLE 4-2

| Surface number | A18 | A20 | A22 | A24 | A26 | A28 | A30 |
|---|---|---|---|---|---|---|---|
| S1 | 6.5594E+03 | −3.4298E+03 | 0.0000E+00 | 0.0000E+00 | 0.0000E+00 | 0.0000E+00 | 0.0000E+00 |
| S2 | 1.2899E+03 | −5.7393E+02 | 0.0000E+00 | 0.0000E+00 | 0.0000E+00 | 0.0000E+00 | 0.0000E+00 |
| S3 | 8.2841E+02 | −3.3148E+02 | 0.0000E+00 | 0.0000E+00 | 0.0000E+00 | 0.0000E+00 | 0.0000E+00 |
| S4 | 1.6372E+02 | −5.8244E+01 | 0.0000E+00 | 0.0000E+00 | 0.0000E+00 | 0.0000E+00 | 0.0000E+00 |
| S6 | 6.3516E+04 | −1.0883E+05 | 1.2853E+05 | −9.8399E+04 | 4.2551E+04 | −6.4267E+03 | −1.0248E+03 |
| S7 | −1.5471E+04 | 2.2526E+04 | −2.3481E+04 | 1.7086E+04 | −8.2416E+04 | 2.3684E+03 | −3.0693E+02 |
| S8 | −1.0315E+03 | 1.0253E+03 | −7.2488E+02 | 3.5502E+02 | −1.1430E+02 | 2.1730E+01 | −1.8462E+00 |
| S9 | 3.9442E+00 | −1.2762E+01 | 1.0774E+01 | −5.0623E+00 | 1.4194E+00 | −2.2303E−01 | 1.5192E−02 |
| S10 | −2.4002E−01 | 6.1090E−02 | −1.1016E−02 | 1.3735E−03 | −1.1251E−04 | 5.4430E−06 | −1.1768E−07 |
| S11 | −5.7011E−02 | 1.2842E−02 | −2.0577E−03 | 2.2861E−04 | −1.6722E−05 | 7.2368E−07 | −1.4029E−08 |

Figure 4A:
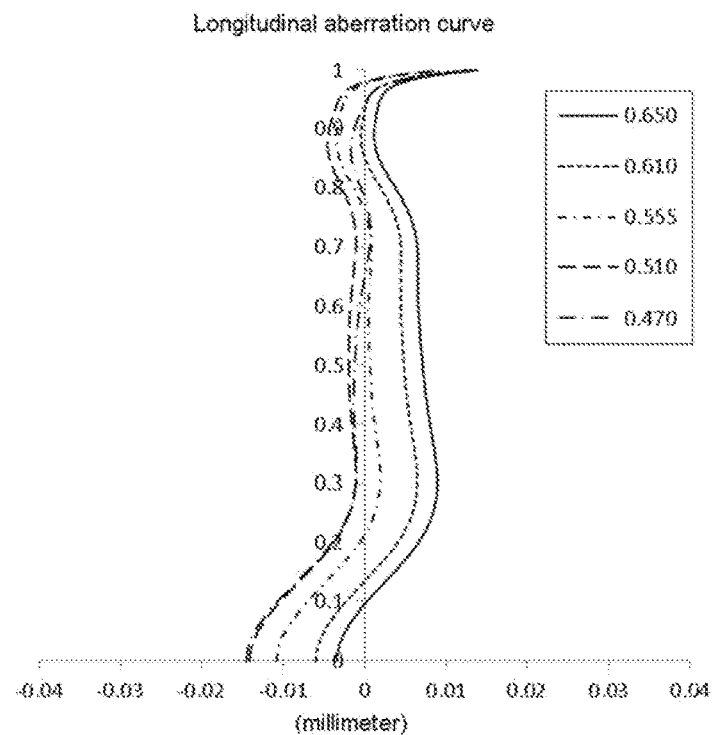
FIG. 4A and FIG. 4B show a longitudinal aberration curve and a distortion curve of an optical imaging lens assembly according to embodiment 2 respectively.
Figure 4B:
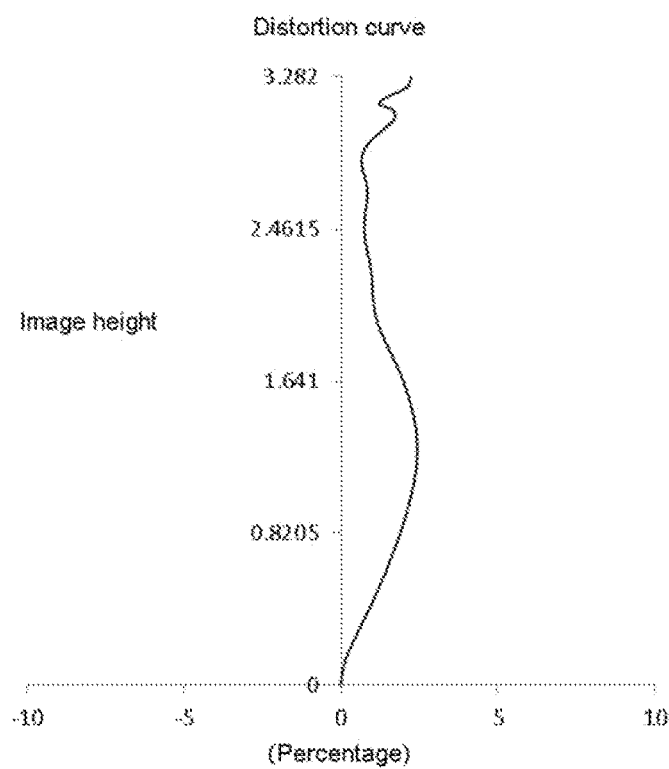

FIG. 4A shows a longitudinal aberration curve of the optical imaging lens assembly according to embodiment 2 to represent deviation of a convergence focal point after light with different wavelengths passes through the lens. FIG. 4B shows a distortion curve of the optical imaging lens assembly according to embodiment 2 to represent distortion values corresponding to different image heights. According to FIG. 4A and FIG. 4B, it can be seen that the optical imaging lens assembly provided in embodiment 2 may achieve high imaging quality.

Embodiment 3

Figure 5:
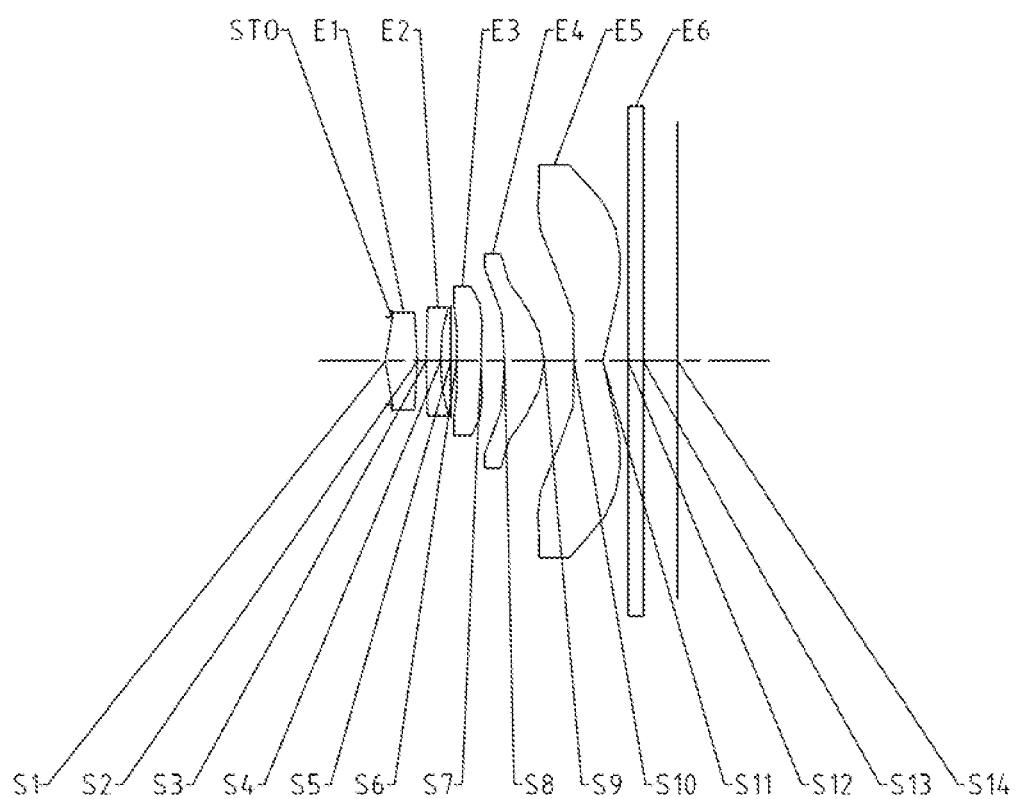
FIG. 5 shows a structure diagram of an optical imaging lens assembly according to embodiment 3 of the disclosure.

An optical imaging lens assembly according to embodiment 3 of the disclosure will be described below with reference to FIG. 5 to FIG. 6B. FIG. 5 is a structure diagram of an optical imaging lens assembly according to embodiment 3 of the disclosure.

As shown in FIG. 5, the optical imaging lens assembly sequentially includes, from an object side to an image side, an aperture diaphragm STO, a first lens E1, a second lens E2, a third lens E3, a fourth lens E4, a fifth lens E5, an optical filter E6 and an imaging surface S14.

The first lens E1 has positive refractive power, an object-side surface S1 thereof is a convex surface, while an image-side surface S2 is a concave surface. The second lens E2 has negative refractive power, an object-side surface S3 thereof is a convex surface, while an image-side surface S4 is a concave surface. The third lens E3 has negative refractive power, an object-side surface S6 thereof is a convex surface, while an image-side surface S7 is a concave surface. The fourth lens E4 has positive refractive power, an object-side surface S8 thereof is a concave surface, while an image-side surface S9 is a convex surface. The fifth lens E5 has negative refractive power, an object-side surface S10 thereof is a convex surface, while an image-side surface S11 is a concave surface. The optical filter E6 has an object-side surface S12 and an image-side surface S13. Light from an object sequentially penetrates through each of the surfaces S1 to S13 and is finally imaged on the imaging surface S14.

In the example, a total effective focal length f of the optical imaging lens assembly is 2.96 mm, TTL is a distance from an object-side surface of the first lens to an imaging surface of the optical imaging lens assembly on the optical axis, TTL is 4.00 mm, ImgH is a half of a diagonal length of an effective pixel region on the imaging surface S14 of the optical imaging lens assembly, ImgH is 3.28 mm, Semi-FOV is a half of a maximum field of view of the optical imaging lens assembly, Semi-FOV is 47.5°, ARE12 is a contour curve length from an intersection point of an image-side surface of the first lens and the optical axis to a point at ½ of an Entrance Pupil Diameter (EPD) of the optical imaging lens assembly on the image-side surface of the first lens, ARE12 is 0.60 mm, ARE31 is a contour curve length from an intersection point of an object-side surface of the third lens and the optical axis to a point at ½ of the EPD of the optical imaging lens assembly on the object-side surface of the third lens, ARE31 is 0.60 mm, and a maximum effective radius DT51 of the object-side surface of the fifth lens is 2.42 mm.

Table 5 is a basic parameter table of the optical imaging lens assembly of embodiment 3, and units of the curvature radius, the thickness/distance and the focal length are all mm. Tables 6-1 and 6-2 show high-order coefficients applied to each aspheric mirror surface in embodiment 3. A surface type of each aspheric surface may be defined by formula (1) given in embodiment 1.

TABLE 5

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | 350.0000 | | | | |
| STO | Spherical | Infinite | −0.0861 | | | | |
| S1 | Aspheric | 1.6836 | 0.4381 | 1.55 | 56.1 | 3.13 | −0.8813 |
| S2 | Aspheric | 95.2340 | 0.1194 | | | | −99.0000 |
| S3 | Aspheric | 21.0626 | 0.2000 | 1.68 | 19.2 | −6.96 | −99.0000 |
| S4 | Aspheric | 3.8384 | 0.1399 | | | | 7.3479 |
| S5 | Spherical | Infinite | 0.0772 | | | | |
| S6 | Aspheric | 5.9026 | 0.3376 | 1.55 | 56.1 | −58.57 | 18.7826 |
| S7 | Aspheric | 4.8822 | 0.3157 | | | | −74.3516 |
| S8 | Aspheric | −8.1485 | 0.5458 | 1.55 | 56.1 | 2.13 | 11.9866 |
| S9 | Aspheric | −1.0433 | 0.4063 | | | | −1.0774 |
| S10 | Aspheric | 16.4834 | 0.3948 | 1.54 | 55.7 | −2.24 | 43.8405 |
| S11 | Aspheric | 1.1109 | 0.3431 | | | | −0.9732 |
| S12 | Spherical | Infinite | 0.2100 | 1.52 | 64.2 | | |
| S13 | Spherical | Infinite | 0.4698 | | | | |
| S14 | Spherical | Infinite | | | | | |

TABLE 6-1

| Surface number | A4 | A6 | A8 | A10 | A12 | A14 | A16 |
|---|---|---|---|---|---|---|---|
| S1 | −7.2634E−02 | 1.4305E+00 | −2.5123E+01 | 2.5001E+02 | −1.5529E+03 | 6.0407E+03 | −1.4314E+04 |
| S2 | −1.6140E−01 | 2.5720E−01 | −4.7691E+00 | 4.2072E+01 | −2.3319E+02 | 7.8299E+02 | −1.5403E+03 |
| S3 | −9.3916E−02 | 1.2967E+00 | −1.2879E+01 | 8.7519E+01 | −3.7908E+02 | 1.0214E+03 | −1.6427E+03 |
| S4 | −2.7575E−02 | 3.4143E−01 | 1.1179E+00 | −1.5485E+01 | 7.7597E+01 | −2.2503E+02 | 3.8878E+02 |
| S6 | −4.9722E−01 | 5.7565E+00 | −1.0048E+02 | 1.1691E+03 | −9.2251E+03 | 5.1035E+04 | −2.0236E+05 |
| S7 | −4.5755E−02 | −3.5972E+00 | 5.1148E+01 | −4.3643E+02 | 2.4557E+03 | 9.5808E+03 | 2.6656E+04 |
| S8 | 4.4001E−03 | −1.0180E+00 | 8.5513E+00 | −4.4691E+01 | 1.5294E+02 | −3.6222E+02 | 6.1257E+02 |
| S9 | 2.4266E−01 | −1.7039E+00 | 9.6797E+00 | −3.7241E+01 | 9.5468E+01 | −1.6782E+02 | 2.0704E+02 |
| S10 | −1.4797E−01 | −1.3584E−01 | 1.5611E−02 | 5.0561E−01 | −8.1221E−01 | 6.6429E−01 | −3.4446E−01 |
| S11 | −3.6240E−01 | 1.5119E−01 | −1.7311E−02 | −6.4352E−04 | −2.7297E−02 | 3.5283E−02 | −2.2051E−02 |

TABLE 6-2

| Surface number | A18 | A20 | A22 | A24 | A26 | A28 | A30 |
|---|---|---|---|---|---|---|---|
| S1 | 1.8887E+04 | −1.0641E+04 | 0.0000E+00 | 0.0000E+00 | 0.0000E+00 | 0.0000E+00 | 0.0000E+00 |
| S2 | 1.6365E+03 | −7.2836E+02 | 0.0000E+00 | 0.0000E+00 | 0.0000E+00 | 0.0000E+00 | 0.0000E+00 |
| S3 | 1.4421E+03 | −5.3264E+02 | 0.0000E+00 | 0.0000E+00 | 0.0000E+00 | 0.0000E+00 | 0.0000E+00 |
| S4 | −3.6651E+02 | 1.4410E+02 | 0.0000E+00 | 0.0000E+00 | 0.0000E+00 | 0.0000E+00 | 0.0000E+00 |
| S6 | 5.8154E+05 | −1.2124E+06 | 1.8141E+06 | −1.8977E+06 | 1.3171E+06 | −5.4471E+05 | 1.0158E+05 |
| S7 | −5.3626E+04 | 7.8171E+04 | −8.1735E+04 | 5.9720E+04 | −2.8937E+04 | 8.3516E+03 | −1.0863E+03 |
| S8 | −7.4977E+02 | 6.6482E+02 | −4.2225E+02 | 1.8691E+02 | −5.4653E+01 | 9.4665E+00 | −7.3387E−01 |
| S9 | −1.8127E+02 | 1.1279E+02 | −4.9414E+01 | 1.4871E+01 | −2.9213E+00 | 3.3663E−01 | −1.7212E−02 |
| S10 | 1.2167E−01 | −3.0073E−02 | 5.2146E−03 | −6.2240E−04 | 4.8739E−05 | −2.2547E−06 | 4.6693E−08 |
| S11 | 8.5094E−03 | −2.1831E−03 | 3.8044E−04 | −4.4620E−05 | 3.3769E−06 | −1.4910E−07 | 2.9196E−09 |

Figure 6A:
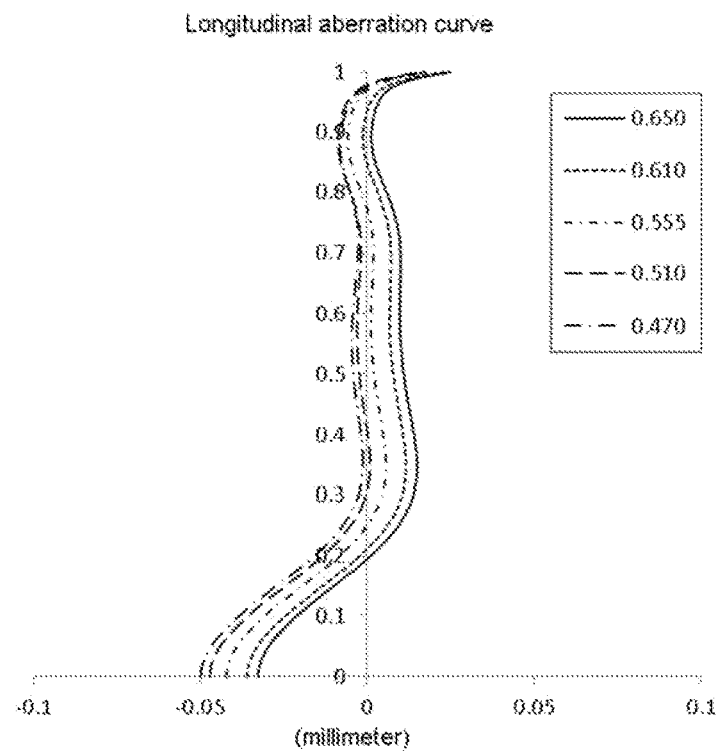
FIG. 6A and FIG. 6B show a longitudinal aberration curve and a distortion curve of an optical imaging lens assembly according to embodiment 3 respectively.
Figure 6B:
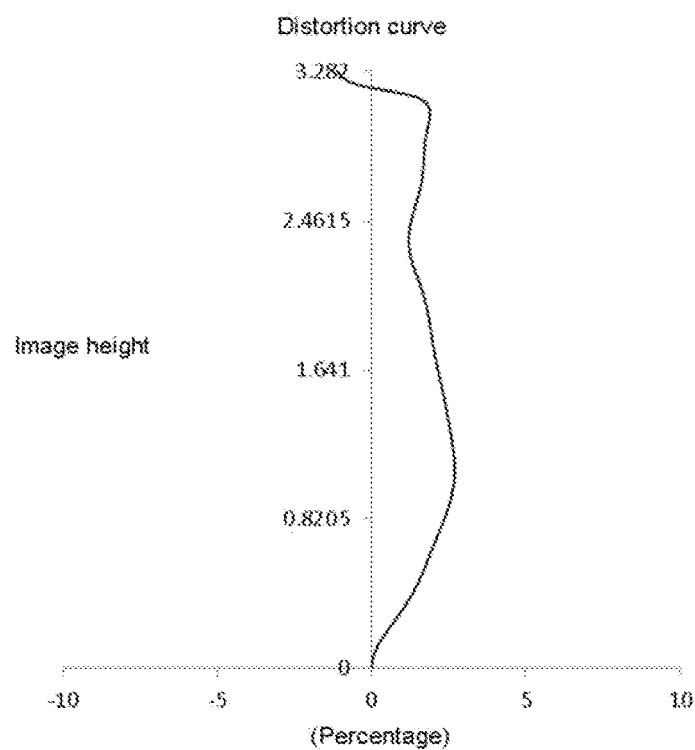

FIG. 6A shows a longitudinal aberration curve of the optical imaging lens assembly according to embodiment 3 to represent deviation of a convergence focal point after light with different wavelengths passes through the lens. FIG. 6B shows a distortion curve of the optical imaging lens assembly according to embodiment 3 to represent distortion values corresponding to different image heights. According to FIG. 6A and FIG. 6B, it can be seen that the optical imaging lens assembly provided in embodiment 3 may achieve high imaging quality.

Embodiment 4

Figure 7:
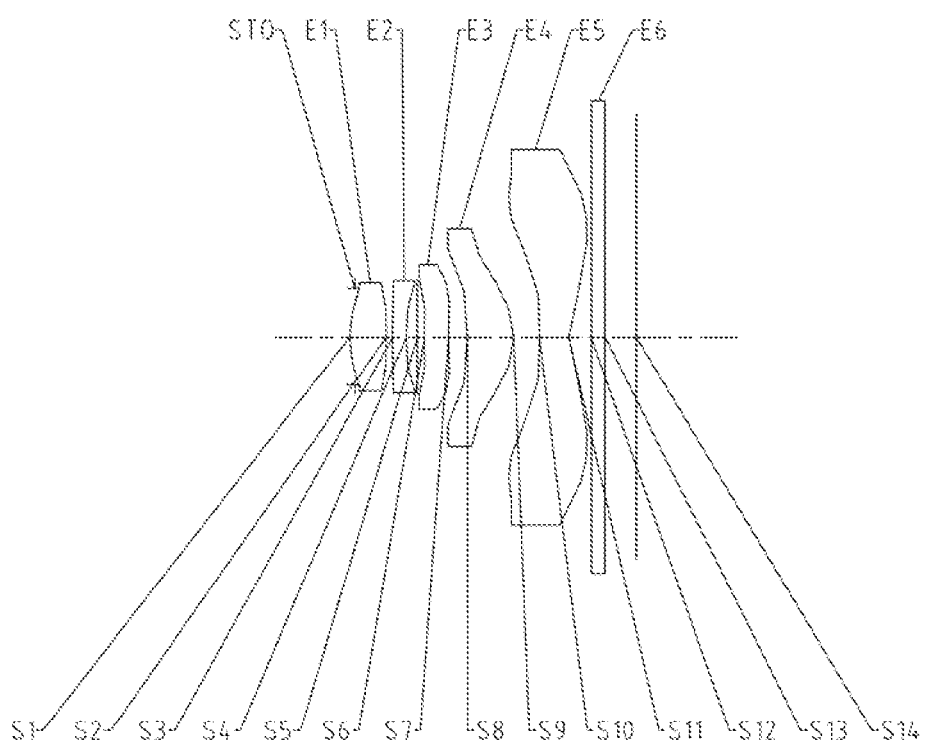
FIG. 7 shows a structure diagram of an optical imaging lens assembly according to embodiment 4 of the disclosure.

An optical imaging lens assembly according to embodiment 4 of the disclosure will be described below with reference to FIG. 7 to FIG. 8B. FIG. 7 is a structure diagram of an optical imaging lens assembly according to embodiment 4 of the disclosure.

As shown in FIG. 7, the optical imaging lens assembly sequentially includes, from an object side to an image side, an aperture diaphragm STO, a first lens E1, a second lens E2, a third lens E3, a fourth lens E4, a fifth lens E5, an optical filter E6 and an imaging surface S14.

The first lens E1 has positive refractive power, an object-side surface S1 thereof is a convex surface, while an image-side surface S2 is a convex surface. The second lens E2 has negative refractive power, an object-side surface S3 thereof is a concave surface, while an image-side surface S4 is a concave surface. The third lens E3 has negative refractive power, an object-side surface S6 thereof is a convex surface, while an image-side surface S7 is a concave surface. The fourth lens E4 has positive refractive power, an object-side surface S8 thereof is a concave surface, while an image-side surface S9 is a convex surface. The fifth lens E5 has negative refractive power, an object-side surface S10 thereof is a convex surface, while an image-side surface S11 is a concave surface. The optical filter E6 has an object-side surface S12 and an image-side surface S13. Light from an object sequentially penetrates through each of the surfaces S1 to S13 and is finally imaged on the imaging surface S14.

In the example, a total effective focal length f of the optical imaging lens assembly is 3.24 mm, a TTL of the optical imaging lens assembly is 4.30 mm, ImgH is a half of a diagonal length of an effective pixel region on the imaging surface S14 of the optical imaging lens assembly, ImgH is 3.28 mm, Semi-FOV is a half of a maximum field of view of the optical imaging lens assembly, Semi-FOV is 45.0°, ARE12 is a contour curve length from an intersection point of an image-side surface of the first lens and the optical axis to a point at ½ of an Entrance Pupil Diameter (EPD) of the optical imaging lens assembly on the image-side surface of the first lens, ARE12 is 0.71 mm, ARE31 is a contour curve length from an intersection point of an object-side surface of the third lens and the optical axis to a point at ½ of the EPD of the optical imaging lens assembly on the object-side surface of the third lens, ARE31 is 0.71 mm, and a maximum effective radius DT51 of the object-side surface of the fifth lens is 2.39 mm.

Table 7 is a basic parameter table of the optical imaging lens assembly of embodiment 4, and units of the curvature radius, the thickness/distance and the focal length are all mm. Tables 8-1 and 8-2 show high-order coefficients applied to each aspheric mirror surface in embodiment 4. A surface type of each aspheric surface may be defined by formula (1) given in embodiment 1.

TABLE 7

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | 350.0000 | | | | |
| S0 | Spherical | Infinite | −0.0800 | | | | |
| S1 | Aspheric | 1.6810 | 0.5512 | 1.55 | 56.1 | 2.96 | −0.4403 |
| S2 | Aspheric | −38.0173 | 0.0904 | | | | −99.0000 |
| S3 | Aspheric | −63.0847 | 0.2100 | 1.68 | 19.2 | −6.33 | 80.0000 |
| S4 | Aspheric | 4.6120 | 0.1604 | | | | 7.2831 |
| S5 | Spherical | Infinite | 0.1110 | | | | |
| S6 | Aspheric | 6.6667 | 0.3607 | 1.55 | 56.1 | −77.22 | −15.3054 |
| S7 | Aspheric | 5.6464 | 0.2848 | | | | −99.0000 |
| S8 | Aspheric | −6.8192 | 0.6951 | 1.55 | 56.1 | 2.37 | 6.3905 |
| S9 | Aspheric | −1.1253 | 0.3825 | | | | −1.0591 |
| S10 | Aspheric | 16.4792 | 0.4435 | 1.54 | 55.7 | −2.27 | 44.7338 |
| S11 | Aspheric | 1.1233 | 0.3375 | | | | −0.9586 |
| S12 | Spherical | Infinite | 0.2100 | 1.52 | 64.2 | | |
| S13 | Spherical | Infinite | 0.4640 | | | | |
| S14 | Spherical | Infinite | | | | | |

TABLE 8-1

| Surface number | A4 | A6 | A8 | A10 | A12 | A14 | A16 |
|---|---|---|---|---|---|---|---|
| S1 | −3.6116E−02 | 3.2936E−01 | −4.7278E+00 | 3.4777E+01 | −1.5891E+02 | 4.5079E+02 | −7.7589E+02 |
| S2 | −1.7667E−01 | 3.5756E−01 | −2.2528E+00 | 1.0313E+01 | −3.5179E+01 | 7.8770E+01 | −1.0690E+02 |
| S3 | −9.6149E−02 | 7.0408E−01 | −3.2129E+00 | 1.5032E+01 | −5.4956E+01 | 1.3201E+02 | −1.9047E+02 |
| S4 | −3.8944E−02 | 5.6818E−01 | −1.7173E+00 | 6.0462E+00 | −2.0177E+01 | 4.7778E+01 | −7.0173E+01 |
| S6 | −4.0087E−01 | 3.4341E+00 | −4.9537E+01 | 4.8314E+02 | −3.2284E+03 | 1.5211E+04 | −5.1545E+04 |
| S7 | −1.4631E−01 | −6.7413E−01 | 1.0624E+01 | −9.3961E+01 | 5.2373E+02 | −1.9791E+03 | 5.2715E+03 |
| S8 | −3.1691E−02 | −4.1728E−02 | −1.1729E+00 | 9.9162E+00 | −4.3920E+01 | 1.3000E+02 | −2.6265E+02 |
| S9 | 2.0147E−01 | −9.9627E−01 | 4.6499E+00 | −1.6269E+01 | 3.9158E+01 | −6.5185E+01 | 7.6295E+01 |
| S10 | −1.2557E−01 | −2.1015E−01 | 3.7544E−01 | −2.7407E−01 | 1.1432E−01 | −2.8169E−02 | 4.6975E−03 |
| S11 | −3.5906E−01 | 1.8825E−01 | −5.2094E−02 | −9.1482E−03 | 1.3508E−02 | −3.5474E−03 | −9.7875E−04 |

TABLE 8-2

| Surface number | A18 | A20 | A22 | A24 | A26 | A28 | A30 |
|---|---|---|---|---|---|---|---|
| S1 | 7.4175E+02 | −3.0233E+02 | 0.0000E+00 | 0.0000E+00 | 0.0000E+00 | 0.0000E+00 | 0.0000E+00 |
| S2 | 7.9876E−01 | −2.5647E+01 | 0.0000E+00 | 0.0000E+00 | 0.0000E+00 | 0.0000E+00 | 0.0000E+00 |
| S3 | 1.5060E+02 | −5.0678E+01 | 0.0000E+00 | 0.0000E+00 | 0.0000E+00 | 0.0000E+00 | 0.0000E+00 |
| S4 | 5.8292E+01 | −2.1032E+01 | 0.0000E+00 | 0.0000E+00 | 0.0000E+00 | 0.0000E+00 | 0.0000E+00 |
| S6 | 1.2684E+05 | −2.2661E+05 | 2.9053E+05 | −2.6011E+05 | 1.5414E+05 | −5.4209E+04 | 8.5423E+03 |
| S7 | −1.0091E+04 | 1.3955E+04 | −1.3825E+04 | 9.5711E+03 | −4.3973E+03 | 1.2048E+03 | −1.4899E+02 |
| S8 | 3.7312E+02 | −3.7666E+02 | 2.6852E+02 | −1.3195E+02 | 4.2465E+01 | −8.0489E+00 | 6.8064E−01 |
| S9 | −6.3323E+01 | 3.7294E+01 | −1.5446E+01 | 4.3922E+00 | −8.1586E−01 | 8.9112E−02 | −4.3390E−03 |
| S10 | −1.4798E−03 | 7.7121E−04 | −2.5970E−04 | 5.1794E−05 | −6.1285E−06 | 4.0134E−07 | −1.1266E−08 |
| S11 | 1.0048E−03 | −3.5216E−04 | 7.1828E−05 | −9.2427E−06 | 7.4187E−07 | −3.4040E−08 | 6.8343E−10 |

Figure 8A:
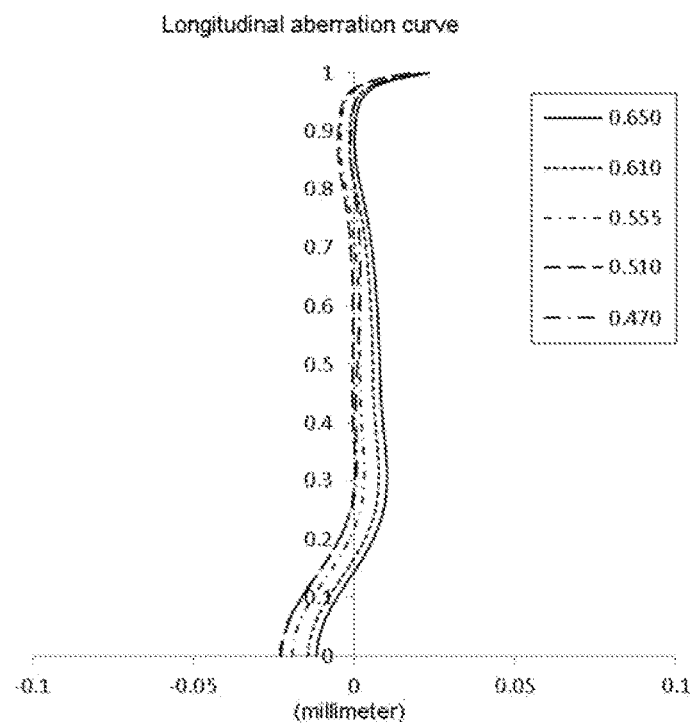
FIG. 8A and FIG. 8B show a longitudinal aberration curve and a distortion curve of an optical imaging lens assembly according to embodiment 4 respectively.
Figure 8B:
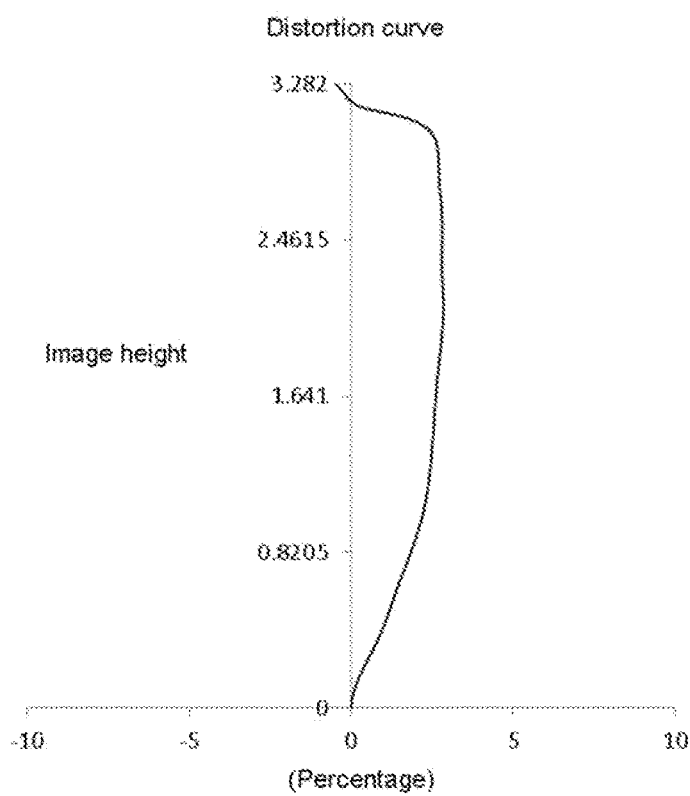

FIG. 8A shows a longitudinal aberration curve of the optical imaging lens assembly according to embodiment 4 to represent deviation of a convergence focal point after light with different wavelengths passes through the lens. FIG. 8B shows a distortion curve of the optical imaging lens assembly according to embodiment 4 to represent distortion values corresponding to different image heights. According to FIG. 8A and FIG. 8B, it can be seen that the optical imaging lens assembly provided in embodiment 4 may achieve high imaging quality.

Embodiment 5

Figure 9:
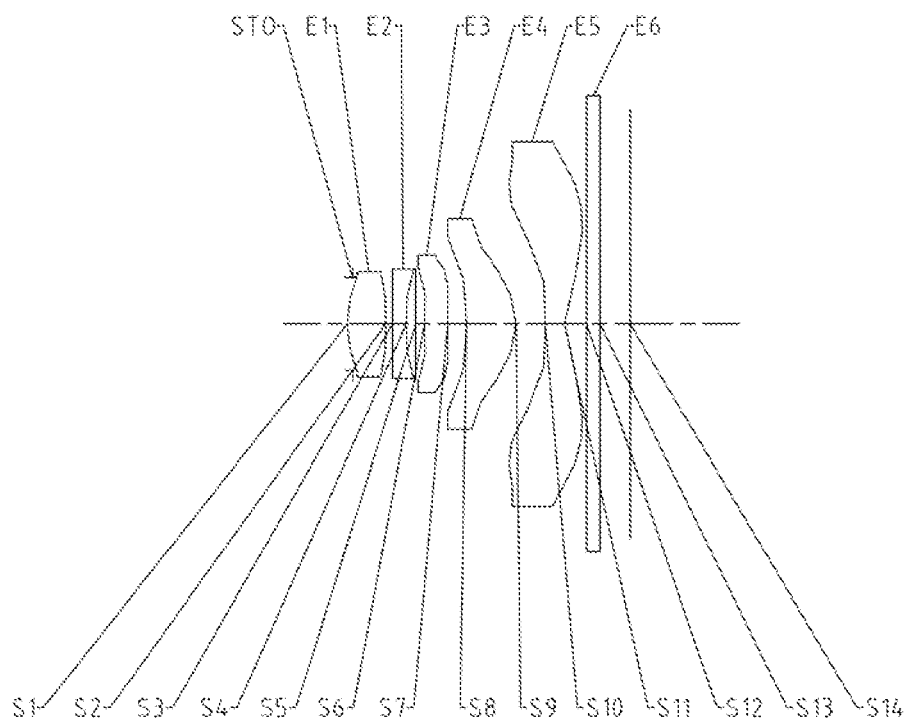
FIG. 9 shows a structure diagram of an optical imaging lens assembly according to embodiment 5 of the disclosure.

An optical imaging lens assembly according to embodiment 5 of the disclosure will be described below with reference to FIG. 9 to FIG. 10B. FIG. 9 is a structure diagram of an optical imaging lens assembly according to embodiment 5 of the disclosure.

As shown in FIG. 9, the optical imaging lens assembly sequentially includes, from an object side to an image side, an aperture diaphragm STO, a first lens E1, a second lens E2, a third lens E3, a fourth lens E4, a fifth lens E5, an optical filter E6 and an imaging surface S14.

The first lens E1 has positive refractive power, an object-side surface S1 thereof is a convex surface, while an image-side surface S2 is a convex surface. The second lens E2 has negative refractive power, an object-side surface S3 thereof is a concave surface, while an image-side surface S4 is a concave surface. The third lens E3 has negative refractive power, an object-side surface S6 thereof is a convex surface, while an image-side surface S7 is a concave surface. The fourth lens E4 has positive refractive power, an object-side surface S8 thereof is a concave surface, while an image-side surface S9 is a convex surface. The fifth lens E5 has negative refractive power, an object-side surface S10 thereof is a concave surface, while an image-side surface S11 is a concave surface. The optical filter E6 has an object-side surface S12 and an image-side surface S13. Light from an object sequentially penetrates through each of the surfaces S1 to S13 and is finally imaged on the imaging surface S14.

In the example, a total effective focal length f of the optical imaging lens assembly is 3.24 mm, a TTL of the optical imaging lens assembly is 4.33 mm, ImgH is a half of a diagonal length of an effective pixel region on the imaging surface S14 of the optical imaging lens assembly, ImgH is 3.28 mm, Semi-FOV is a half of a maximum field of view of the optical imaging lens assembly, Semi-FOV is 45.0°, ARE12 is a contour curve length from an intersection point of an image-side surface of the first lens and the optical axis to a point at ½ of an Entrance Pupil Diameter (EPD) of the optical imaging lens assembly on the image-side surface of the first lens, ARE12 is 0.72 mm, ARE31 is a contour curve length from an intersection point of an object-side surface of the third lens and the optical axis to a point at ½ of the EPD of the optical imaging lens assembly on the object-side surface of the third lens, is 0.71 mm, and a maximum effective radius DT51 of the object-side surface of the fifth lens is 2.47 mm.

Table 9 is a basic parameter table of the optical imaging lens assembly of embodiment 5, and units of the curvature radius, the thickness/distance and the focal length are all mm. Tables 10-1 and 10-2 show high-order coefficients applied to each aspheric mirror surface in embodiment 5. A surface type of each aspheric surface may be defined by formula (1) given in embodiment 1.

TABLE 9

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | 350.0000 | | | | |
| STO | Spherical | Infinite | −0.0800 | | | | |
| S1 | Aspheric | 1.7217 | 0.5840 | 1.55 | 56.1 | 3.01 | −0.3309 |
| S2 | Aspheric | −32.5936 | 0.1020 | | | | −99.0000 |
| S3 | Aspheric | −22.2885 | 0.2100 | 1.68 | 19.2 | −6.52 | 80.0000 |
| S4 | Aspheric | 5.5318 | 0.1502 | | | | 6.9158 |
| S5 | Spherical | Infinite | 0.1354 | | | | |
| S6 | Aspheric | 7.5738 | 0.3497 | 1.55 | 56.1 | −46.03 | −40.8872 |
| S7 | Aspheric | 5.7250 | 0.2882 | | | | −99.0000 |
| S8 | Aspheric | −9.0514 | 0.7608 | 1.55 | 56.1 | 2.13 | 17.8274 |
| S9 | Aspheric | −1.0616 | 0.4440 | | | | −1.1243 |
| S10 | Aspheric | −100.0000 | 0.2991 | 1.54 | 55.7 | −2.04 | 44.7338 |
| S11 | Aspheric | 1.1092 | 0.3333 | | | | −0.9619 |
| S12 | Spherical | Infinite | 0.2100 | 1.52 | 64.2 | | |
| S13 | Spherical | Infinite | 0.4584 | | | | |
| S14 | Spherical | Infinite | | | | | |

TABLE 10-1

| Surface number | A4 | A6 | A8 | A10 | A12 | A14 | A16 |
|---|---|---|---|---|---|---|---|
| S1 | −3.2289E−02 | 2.2867E−01 | −3.0241E+00 | 2.0072E+01 | −8.4018E+01 | 2.2030E+02 | −3.5351E+02 |
| S2 | −1.6050E−01 | 3.7914E−01 | −3.2083E+00 | 1.7121E+01 | −6.1822E+01 | 1.4279E+02 | −1.9973E+02 |
| S3 | −7.3246E−02 | 5.8660E−01 | −3.0264E+00 | 1.3719E+01 | −4.5684E+01 | 9.9888E+01 | −1.3145E+02 |
| S4 | −1.4537E−02 | 4.6405E−01 | −1.4803E+00 | 5.1651E+00 | −1.6172E+01 | 3.5735E+01 | −4.9092E+01 |
| S6 | −3.8988E−01 | 3.4019E+00 | −5.1464E+01 | 5.2199E+02 | −3.6197E+03 | 1.7698E+04 | −6.2313E+04 |
| S7 | −1.8048E−01 | −1 9938E−01 | 3.4824E+00 | −3.0114E+01 | 1.5695E+02 | −5.4340E+02 | 1.3094E+03 |
| S8 | −5.9638E−02 | 9.1621E−02 | −1.8229E+00 | 1.1920E+01 | −4.8567E+01 | 1.3216E+02 | −2.4804E+02 |

TABLE 10-1-continued

| Surface number | A4 | A6 | A8 | A10 | A12 | A14 | A16 |
|---|---|---|---|---|---|---|---|
| S9 | 2.1432E−01 | −7.6959E−01 | 2.9719E+00 | −9.4644E+00 | 2.1217E+01 | −3.3023E+01 | 3.6122E+01 |
| S10 | −6.3418E−02 | −2.9495E−01 | 3.9726E−01 | −1.5049E−01 | −1.0976E−01 | 1.7500E−01 | −1.1266E−01 |
| S11 | −3.5833E−01 | 1.5245E−01 | 3.8030E−03 | −5.4486E−02 | 3.8131E−02 | −1.3761E−02 | 2.5155E−03 |

TABLE 10-2

| number Surface | A18 | A20 | A22 | A24 | A26 | A28 | A30 |
|---|---|---|---|---|---|---|---|
| S1 | 3.1754E+02 | −1.2251E+02 | 0.0000E+00 | 0.0000E+00 | 0.0000E+00 | 0.0000E+00 | 0.0000E+00 |
| S2 | 1.5390E+02 | −5.0352E+01 | 0.0000E+00 | 0.0000E+00 | 0.0000E+00 | 0.0000E+00 | 0.0000E+00 |
| S3 | 9.4449E+01 | −2.8741E+01 | 0.0000E+00 | 0.0000E+00 | 0.0000E+00 | 0.0000E+00 | 0.0000E+00 |
| S4 | 3.8204E−01 | −1.2893E+01 | 0.0000E+00 | 0.0000E+00 | 0.0000E+00 | 0.0000E+00 | 0.0000E+00 |
| S6 | 1.5963E+05 | −2.9761E+05 | 3.9936E+05 | −3.7550E+05 | 2.3462E+05 | −8.7425E+04 | 1.4686E+04 |
| S7 | −2.2455E+03 | 2.7573E+03 | −2.4048E+03 | 1.4536E+03 | −5.7905E+02 | 1.3694E+02 | −1.4612E+01 |
| S8 | 3.2807E+02 | −3.0823E+02 | 2.0428E+02 | −9.3199E+01 | 2.7813E+01 | −4.8817E+00 | 3.8177E−01 |
| S9 | −2.7940E+01 | 1.5264E+01 | −5.8278E+00 | 1.5164E+00 | −2.5546E−01 | 2.5043E−02 | −1.0805E−03 |
| S10 | 4.4890E−02 | −1.2078E−02 | 2.2406E−03 | −2.8333E−04 | 2.3365E−05 | −1.1342E−06 | 2.4607E−08 |
| S11 | 9.8225E−06 | −1.2683E−04 | 3.3635E−05 | −4.6762E−06 | 3.8238E−07 | −1.7424E−08 | 3.4299E−10 |
| S1 | 3.1754E+02 | −1.2251E+02 | 0.0000E+00 | 0.0000E+00 | 0.0000E+00 | 0.0000E+00 | 0.0000E+00 |
| S2 | 1.5390E+02 | −5.0352E+01 | 0.0000E+00 | 0.0000E+00 | 0.0000E+00 | 0.0000E+00 | 0.0000E+00 |

Figure 10A:
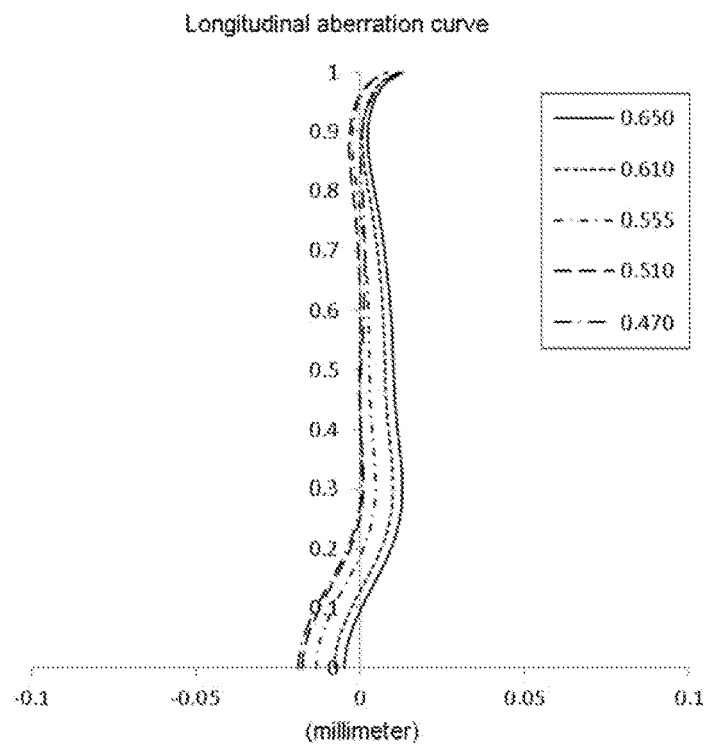
FIG. 10A and FIG. 10B show a longitudinal aberration curve and a distortion curve of an optical imaging lens assembly according to embodiment 5 respectively.
Figure 10B:
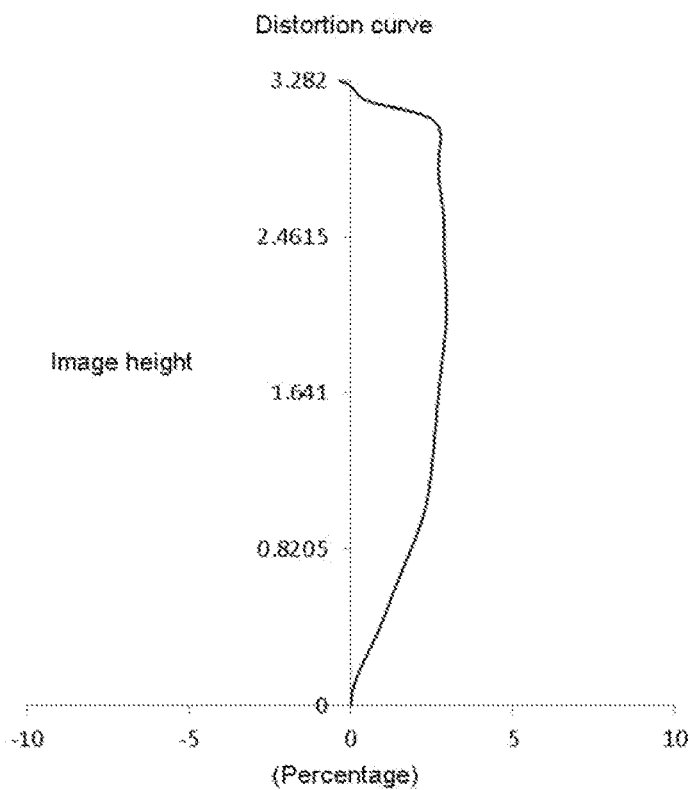

FIG. 10A shows a longitudinal aberration curve of the optical imaging lens assembly according to embodiment 5 to represent deviation of a convergence focal point after light with different wavelengths passes through the lens. FIG. 10B shows a distortion curve of the optical imaging lens assembly according to embodiment 5 to represent distortion values corresponding to different image heights. According to FIG. 10A and FIG. 10B, it can be seen that the optical imaging lens assembly provided in embodiment 5 may achieve high imaging quality.

From the above, embodiment 1 to embodiment 5 meet a relationship shown in Table 11 respectively.

TABLE 11

| Conditional expression/ embodiment | 1 | 2 | 3 | 4 | 5 |
|---|---|---|---|---|---|
| TTL/ImgH | 1.29 | 1.26 | 1.22 | 1.31 | 1.32 |
| Semi-FOV/CRAmax | 1.28 | 1.28 | 1.33 | 1.20 | 1.23 |
| DT51/DT11 | 3.51 | 3.68 | 3.99 | 3.23 | 3.32 |
| ARE12/|SGA12| | 16.03 | 15.04 | 16.70 | 9.38 | 9.35 |
| ARE31/|SGA31| | 12.06 | 10.36 | 14.17 | 8.81 | 6.78 |
| V2/R4 (mm$^{-1}$) | 5.69 | 5.62 | 5.00 | 4.16 | 3.47 |
| fm/fp | −18.19 | −18.09 | −12.86 | −16.10 | −10.61 |
| V4/R7 (mm$^{-1}$) | −8.45 | −6.97 | −6.88 | −8.23 | −6.20 |
| T45/CT2 | 1.78 | 2.04 | 2.03 | 1.82 | 2.11 |
| f/EPD | 2.47 | 2.47 | 2.47 | 2.27 | 2.27 |
| SL/ΣCT | 1.89 | 1.89 | 2.04 | 1.87 | 1.93 |
| R4/R1 | 2.15 | 2.11 | 2.28 | 2.74 | 3.21 |
| R5/R10 | 5.32 | 5.09 | 5.31 | 5.93 | 6.83 |

The disclosure also provides an imaging device, of which an electronic photosensitive element may be a Charge Coupled Device (CCD) or a Complementary Metal Oxide Semiconductor (CMOS). The imaging device may be an independent imaging device such as a digital camera, and may also be an imaging module integrated into a mobile electronic device such as a mobile phone. The imaging device is provided with the abovementioned optical imaging lens assembly.

The above description is only description about the preferred embodiments of the disclosure and adopted technical principles. It is understood by those skilled in the art that the scope of the disclosure involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. An optical imaging lens assembly, sequentially comprising, from an object side to an image side along an optical axis, a first lens, a second lens, a third lens, a fourth lens and a fifth lens with refractive power respectively, wherein TTL is a distance from an object-side surface of the first lens to an imaging surface of the optical imaging lens assembly on the optical axis, and ImgH is a half of a diagonal length of an effective pixel region on the imaging surface of the optical imaging lens assembly, TTL and ImgH meet TTL/ImgH<1.5; and a sum fp of effective focal lengths of the lenses with positive refractive power in the first lens to the fifth lens and a sum fm of effective focal lengths of the lenses with negative refractive power in the first lens to the fifth lens meet −19.0<fm/fp<−10.0;

the first lens has positive refractive power, the second lens has negative refractive power, the third lens has negative refractive power, the fourth lens has positive refractive power, the fifth lens has negative refractive power;

ARE12 is a contour curve length from an intersection point of an image-side surface of the first lens and the optical axis to a point at ½ of an Entrance Pupil Diameter (EPD) of the optical imaging lens assembly on the image-side surface of the first lens, and SAG12 is a distance from the intersection point of the image-side surface of the first lens and the optical axis to an effective radius vertex of the image-side surface of the first lens on the optical axis, ARE12 and SAG12 meet 9.0<ARE12/|SAG12|<17.0;

an Abbe number V4 of the fourth lens and a curvature radius R7 of an object-side surface of the fourth lens meet −8.5 mm$^{-1}$<V4/R7<−6.0 mm$^{-1}$.

2. The optical imaging lens assembly according to claim 1, wherein DT11 is a maximum effective radius of the object-side surface of the first lens, and DT51 is a maximum effective radius of an object-side surface of the fifth lens, DT51 and DT11 meet 3.0<DT51/DT11<4.0.

3. The optical imaging lens assembly according to claim 1, wherein ARE31 is a contour curve length from an intersection point of an object-side surface of the third lens and the optical axis to a point at ½ of the EPD of the optical imaging lens assembly on the object-side surface of the third lens, and SAG31 is a distance from the intersection point of the object-side surface of the third lens and the optical axis to an effective radius vertex of the object-side surface of the third lens on the optical axis, ARE31 and SAG31 meet 6.5<ARE31/|SAG31|<14.5.

4. The optical imaging lens assembly according to claim 1, wherein a spacing distance T45 of the fourth lens and the fifth lens on the optical axis and a center thickness CT2 of the second lens on the optical axis meet 1.5<T45/CT2<2.5.

5. The optical imaging lens assembly according to claim 1, wherein the object-side surface thereof is a convex surface.

6. The optical imaging lens assembly according to claim 1, wherein an Abbe number V2 of the second lens and a curvature radius R4 of an image-side surface of the second lens meet 3.0 mm$^{-1}$<V2/R4<6.0 mm$^{-1}$.

7. The optical imaging lens assembly according to claim 1, wherein a total effective focal length f of the optical imaging lens assembly and an Entrance Pupil Diameter (EPD) of the optical imaging lens assembly meet 2.0<f/EPD<2.5.

8. The optical imaging lens assembly according to claim 1, wherein the optical imaging lens assembly further comprises an aperture diaphragm, and a distance SL from the aperture diaphragm to the imaging surface of the optical imaging lens assembly on the optical axis and a sum ΣCT of center thicknesses of the first lens to the fifth lens on the optical axis meet 1.5<SL/ΣCT<2.5.

9. The optical imaging lens assembly according to claim 1, wherein Semi-FOV is a half of a maximum field of view of the optical imaging lens assembly, Semi-FOV and a maximum incident angle CRAmax of incidence of a chief ray in an electronic photosensitive component meet Semi-FOV/CRAmax>1.0.

10. The optical imaging lens assembly according to claim 1, wherein a curvature radius R1 of the object-side surface of the first lens and a curvature radius R4 of an image-side surface of the second lens may meet 2.0<R4/R1<3.5.

11. The optical imaging lens assembly according to claim 1, wherein a curvature radius R5 of an object-side surface of the third lens and a curvature radius R10 of an image-side surface of the fifth lens may meet 5.0<R5/R10<7.0.

12. An optical imaging lens assembly, sequentially comprising, from an object side to an image side along an optical axis, a first lens, a second lens, a third lens, a fourth lens and a fifth lens with refractive power respectively, wherein TTL is a distance from an object-side surface of the first lens to an imaging surface of the optical imaging lens assembly on the optical axis, and ImgH is a half of a diagonal length of an effective pixel region on the imaging surface of the optical imaging lens assembly, TTL and ImgH meet TTL/ImgH<1.5; and ARE12 is a contour curve length from an intersection point of an image-side surface of the first lens and the optical axis to a point at ½ of an Entrance Pupil Diameter (EPD) of the optical imaging lens assembly on the image-side surface of the first lens, and SAG12 is a distance from the intersection point of the image-side surface of the first lens and the optical axis to an effective radius vertex of the image-side surface of the first lens on the optical axis, ARE12 and SAG12 meet 9.0<ARE12/|SAG12|<17.0, an Abbe number V4 of the fourth lens and a curvature radius R7 of an object-side surface of the fourth lens meet −8.5 mm$^{-1}$<V4/R7<−6.0 mm$^{-1}$;

the first lens has positive refractive power, the second lens has negative refractive power, the third lens has negative refractive power, the fourth lens has positive refractive power, the fifth lens has negative refractive power.

13. The optical imaging lens assembly according to claim 12, wherein Semi-FOV is a half of a maximum field of view of the optical imaging lens assembly, Semi-FOV and a maximum incident angle CRAmax of incidence of a chief ray in an electronic photosensitive component meet Semi-FOV/CRAmax>1.0.

14. The optical imaging lens assembly according to claim 12, wherein a sum fp of effective focal lengths of the lenses with positive refractive power in the first lens to the fifth lens and a sum fm of effective focal lengths of the lenses with negative refractive power in the first lens to the fifth lens meet −19.0<fm/fp<−10.0.

15. The optical imaging lens assembly according to claim 12, wherein DT11 is a maximum effective radius of the object-side surface of the first lens, and DT51 is a maximum effective radius of an object-side surface of the fifth lens, DT51 and DT11 meet 3.0<DT51/DT11<4.0.

16. The optical imaging lens assembly according to claim 12, wherein ARE31 is a contour curve length from an intersection point of an object-side surface of the third lens and the optical axis to a point at ½ of the EPD of the optical imaging lens assembly on the object-side surface of the third lens, and SAG31 is a distance from the intersection point of the object-side surface of the third lens and the optical axis to an effective radius vertex of the object-side surface of the third lens on the optical axis, ARE31 and SAG31 meet 6.5<ARE31/|SAG31|<14.5.

17. The optical imaging lens assembly according to claim 12, wherein a spacing distance T45 of the fourth lens and the fifth lens on the optical axis and a center thickness CT2 of the second lens on the optical axis meet 1.5<T45/CT2<2.5.

* * * * *